(12) United States Patent
Morris-Anastasi et al.

(10) Patent No.: US 11,833,461 B2
(45) Date of Patent: Dec. 5, 2023

(54) SMALL DIAMETER TUBULAR POROUS FIBER FILTER

(71) Applicant: Porex Corporation, Fairburn, GA (US)

(72) Inventors: Nicole Elizabeth Morris-Anastasi, Richmond, VA (US); Michael Andrew Clendenning, Sharpsburg, GA (US); Michael W. Spencer, Chesterfield, VA (US); Qiang Zhou, Moseley, VA (US); Guoqiang Mao, Newnan, GA (US)

(73) Assignee: Porex Corporation, Fairburn, GA (US)

( * ) Notice: Subject to any disclaimer, the term of this patent is extended or adjusted under 35 U.S.C. 154(b) by 0 days.

(21) Appl. No.: 16/645,397

(22) PCT Filed: Sep. 7, 2018

(86) PCT No.: PCT/US2018/049865
§ 371 (c)(1),
(2) Date: Mar. 6, 2020

(87) PCT Pub. No.: WO2019/051171
PCT Pub. Date: Mar. 14, 2019

(65) Prior Publication Data
US 2020/0282351 A1    Sep. 10, 2020

Related U.S. Application Data

(60) Provisional application No. 62/555,136, filed on Sep. 7, 2017.

(51) Int. Cl.
*B01D 39/00*    (2006.01)
*B01D 39/16*    (2006.01)
(Continued)

(52) U.S. Cl.
CPC ......... *B01D 39/1623* (2013.01); *B01D 29/03* (2013.01); *B01D 29/31* (2013.01);
(Continued)

(58) Field of Classification Search
CPC .... B01D 39/00; B01D 39/1623; B01D 46/00; B01D 46/2403; B01D 2239/0233;
(Continued)

(56) References Cited

U.S. PATENT DOCUMENTS 4,116,738 A    9/1978  Pall
4,253,476 A *  3/1981  Sato .......................... A24F 7/04
                                            131/336
(Continued)

FOREIGN PATENT DOCUMENTS

CA    1119104       3/1982
CN    201701805 U   1/2011
(Continued)

OTHER PUBLICATIONS

PCT Patent Application No. PCT/US2018/049865 , International Preliminary Report on Patentability, dated Mar. 19, 2020, 6 pages.
(Continued)

*Primary Examiner* — T. Bennett McKenzie
(74) *Attorney, Agent, or Firm* — Kilpatrick Townsend & Stockton LLP

(57) ABSTRACT

The present disclosure provides small diameter tubular porous fiber filters. These tubular porous fiber filters have many uses including but not limited a filtration medium for removing particles of 5 microns or less from liquid or air.

16 Claims, 5 Drawing Sheets

(51) Int. Cl.
*B01D 46/24* (2006.01)
*B01D 29/31* (2006.01)
*B01D 29/33* (2006.01)
*B01D 29/03* (2006.01)

(52) U.S. Cl.
CPC ......... *B01D 29/33* (2013.01); *B01D 46/2403* (2013.01); *B01D 2239/0233* (2013.01); *B01D 2239/1216* (2013.01); *B01D 2239/1233* (2013.01)

(58) Field of Classification Search
CPC .... B01D 2239/1216; B01D 2239/1233; B01D 2201/18; B01D 29/31; B01D 29/33; B01D 29/35; B01D 29/0043
USPC ............................... 55/486; 210/500.1–510.1
See application file for complete search history.

(56) References Cited

U.S. PATENT DOCUMENTS

| | | | | |
|---|---|---|---|---|
| 4,283,289 A * | 8/1981 | Meyst | ............... | B01D 29/33 210/448 |
| 4,917,942 A | 4/1990 | Winters | | |
| 5,580,459 A * | 12/1996 | Powers | ............... | D21H 27/08 442/364 |
| 5,607,766 A * | 3/1997 | Berger | ............... | A24D 3/08 428/36.9 |
| 5,728,298 A * | 3/1998 | Hamlin | ............... | B01D 29/21 428/36.1 |
| 6,126,819 A * | 10/2000 | Heine | ............... | B01D 65/08 210/321.89 |
| 7,833,615 B2 * | 11/2010 | Ramsey | ............ | B01D 67/0009 428/315.7 |
| 2001/0040136 A1 * | 11/2001 | Wei | ............... | B01D 39/2062 427/337 |
| 2004/0098957 A1 * | 5/2004 | Yoo | ............... | A47L 9/127 55/482 |
| 2010/0219122 A1 * | 9/2010 | Ogawa | ............... | B01D 69/02 210/500.23 |
| 2010/0264068 A1 * | 10/2010 | Ikebe | ............... | C02F 9/00 196/46.1 |
| 2011/0073545 A1 * | 3/2011 | Hanson | ............... | C02F 3/1268 210/614 |
| 2015/0283487 A1 * | 10/2015 | Demmel | ............... | B01D 39/14 210/500.21 |

FOREIGN PATENT DOCUMENTS

| | | |
|---|---|---|
| CN | 101098741 B | 10/2012 |
| CN | 103041717 A | 4/2013 |
| CN | 105283087 A | 1/2016 |
| CN | 105289150 A | 2/2016 |
| CN | 205979136 U | 2/2017 |
| CN | 106999829 A | 8/2017 |
| EP | 0695573 A1 | 2/1996 |

OTHER PUBLICATIONS

European Patent Application No. 188534887, Extended European Search Report, dated Apr. 15, 2021, 8 pages
International Search Report and Written Opinion, PCT Patent Application No. PCT/US2018/049865, dated Nov. 5, 2018, 8 pages.
Office Action, Chinese Patent Application No. 201880058249.4, dated Dec. 31, 2021, 12 pages.
Office Action, Chinese Patent Application No. 201880058249.4, dated Jun. 11, 2021, 12 pages.
Chinese Patent Application No. 201880058249.4, Decision Rejection, dated Dec. 28, 2022, 7 pages.
Chinese Patent Application No. 201880058249.4, Office Action, dated Jul. 21, 2022, 17 pages.
"Separation Mechanical Selection and Use Manual", Mechanical Industry Press, May 1998, pp. 114-115.

* cited by examiner

SMALL DIAMETER TUBULAR POROUS FIBER FILTER

FIELD OF THE INVENTION

The present disclosure provides tubular porous fiber filters with relatively small diameters that are strong and that have improved filtration properties.

BACKGROUND

Tubular fiber filters are widely available for filtration. Examples include a non-woven fiber sheet wrapped around a central core or a melt spun fiber filter for a water filter cartridge. However, these filters have diameters generally larger than one inch and/or have inadequate filtration efficiencies and flow rate performance for microfiltration of particle sizes from 0.1 microns to about 10 microns. There is a need for improved tubular porous fiber filters with relatively small diameters that provide strength and improved filtration properties.

SUMMARY OF THE INVENTION

The present disclosure addresses this unmet need and provides tubular porous fiber filters with relatively small diameters that provide strength and improved filtration properties. These tubular porous fiber filters are self-supporting, strong, and efficient at filtering small micron size particles from liquid or air. These filters can be made from bicomponent fibers, monocomponent fibers or combinations of bicomponent fibers and monocomponent fibers.

DETAILED DESCRIPTION

Figure 1:
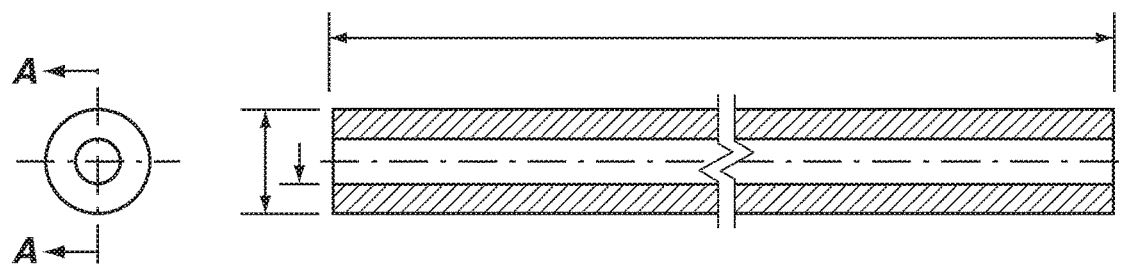
FIG. 1. Schematic representation of a tubular porous fiber filter in longitudinal section.
Figure 2:
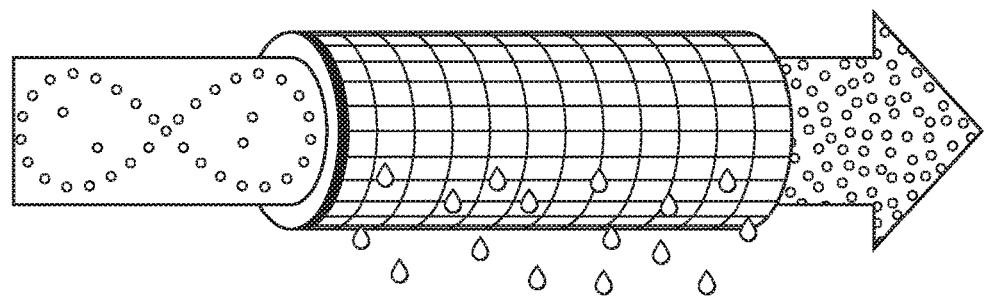
FIG. 2. Schematic representation of use of a tubular porous fiber filter in cross flow filtration.
Figure 3:
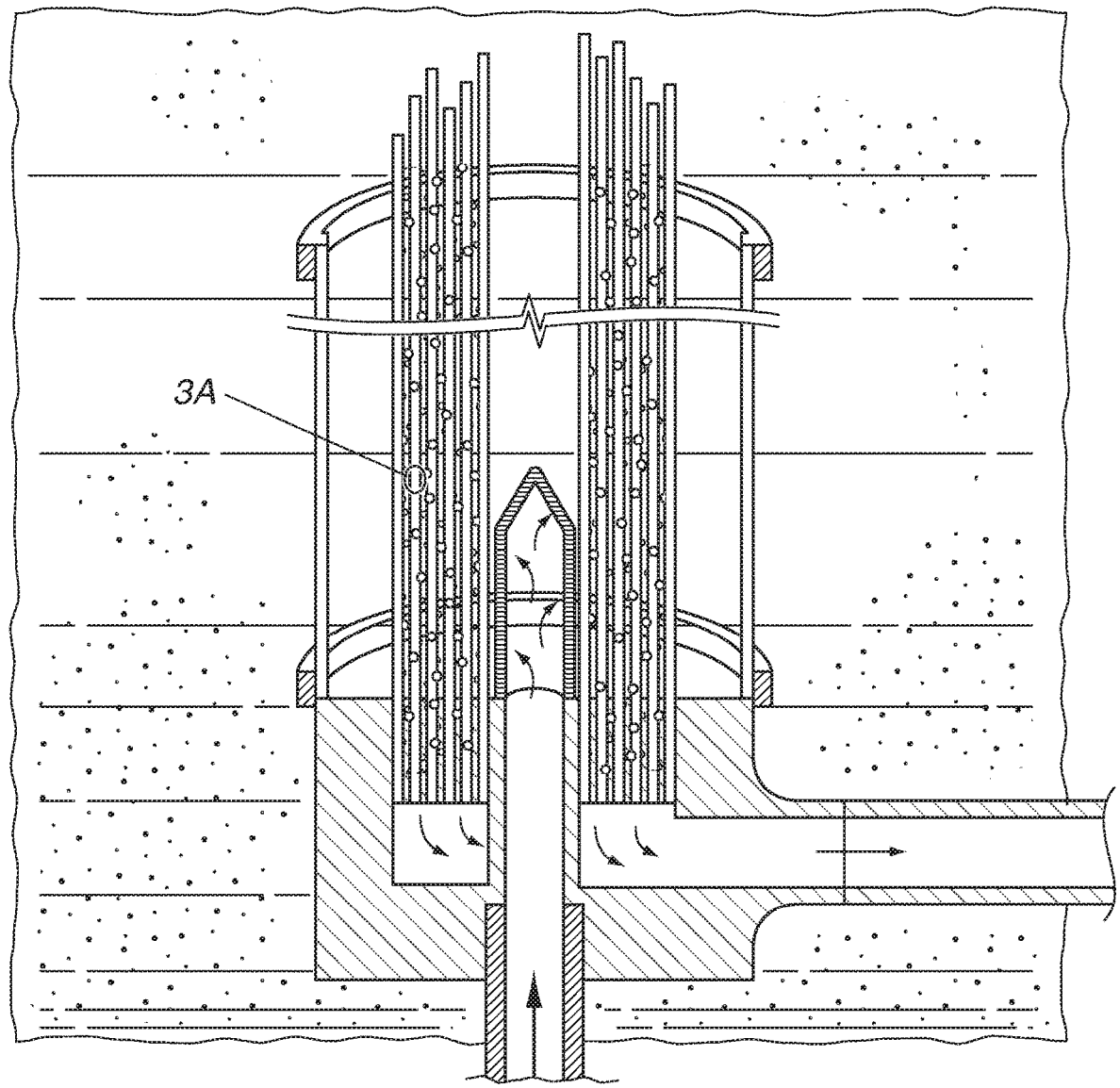
FIG. 3. Schematic representation of use of a tubular porous fiber filter in vacuum filtration.
Figure 3A:
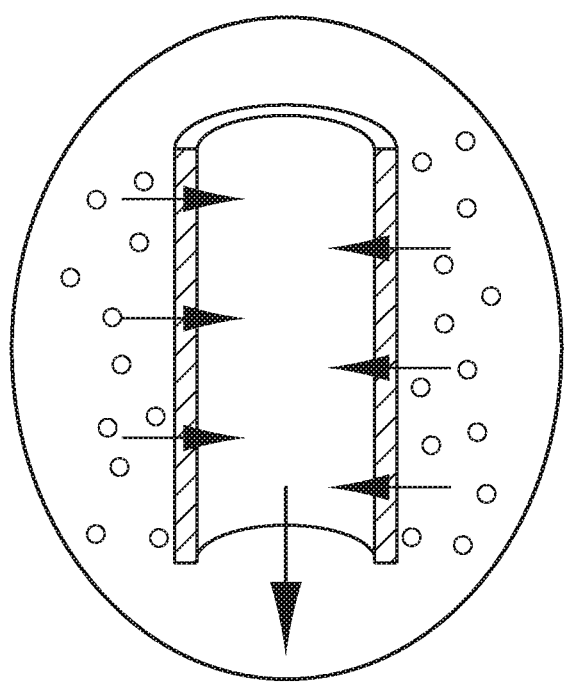
FIG. 3A. Cross-sectional view of the tubular porous fiber filter of FIG. 3.

The present disclosure provides small diameter tubular porous fiber filters. In this application, "small diameter" means a tubular filter having an outer diameter (OD) less than about 1 inch (25.4 mm). In a specific example, the OD may be slightly larger than ½ inch (e.g., about 12.7 mm to about 13.5 mm). In a specific example, the OD may be equal to or less than about ½ inch (12.7 mm). In another example, the OD may be equal to or less than ¼ inch (6.35 mm). In another example, the OD may be equal to or less than ⅛ inch (3.2 mm). In a further example, the tubular porous fiber filter has an OD of between about 2 mm to less than about 25 mm.

The inner diameter (ID) of the tubular porous fibers may be any appropriate value that is less than the OD. For example, in different embodiments, the inner diameter (ID) of the tubular porous fiber filters may be equal to or greater than about 0.5 mm (but less than the OD). In a specific example, the ID may be greater than 0.5 mm. In another example, the ID may be equal to or greater than 1 mm. In a further example, the ID may be equal to or greater than 2 mm. In a further example, the ID may be equal to or greater than 5 mm. In a further example, the ID may be equal to or greater than 10 mm. In a further example, the ID may be equal to or greater than 15 mm.

The inner diameter is situated concentrically in relationship to the outer diameter. The distance between the outer edge of the inner diameter space and the outer diameter of the tube is the same at any point. This leads to a generally consistent wall thickness throughout the tubular filter. The wall thickness of the tubular porous fiber filter may range from about mm to about 15 mm. In a specific example, the wall thickness may be equal to or greater than 1 mm. In another example, the wall thickness may be equal to or greater than 2 mm. In a further example, the wall thickness may be equal to or greater than 3 mm. In a further example, the wall thickness may be equal to or greater than 5 mm.

The tubular porous fiber filter of the present disclosure may be homogenous with a seamless structure.

The tubular porous fiber filter of the present disclosure may be self-supporting.

The tubular porous fiber filter of the present disclosure may have a tensile strength great than about 50000 PSI along the long axis of the filter using the ASTM D638 method.

The tubular porous fiber filter of the present disclosure may be strong with a burst strength of at least about 50 pounds per square inch (PSI). In one specific example, the burst strength may be at least 100 PSI. In another example, the burst strength may be at least 200 PSI. In a further example, the burst strength may be at least 500 PSI.

The tubular porous fiber filter of the present disclosure may have a strength that allows it to be back washed at pressures greater than about 20 PSI. In another example, the tubular porous fiber filter may have a strength that allows it to be back washed at pressures greater than 30 PSI. In a further example, the tubular porous fiber filter may have a strength that allows it to be back washed at pressures or greater than 50 PSI.

In various embodiments, the tubular porous fiber filters of the present disclosure do not contain a binding agent. Additionally, the fibers in the filters may be thermally fused together at spaced apart locations.

In different embodiments, the fibers in the tubular porous fiber filter of the present disclosure have an average diameter less than about 20 microns. In a specific example, the fibers have an average diameter of less than about 15 microns. In another example, the fibers have an average diameter of less than about 10 microns. In a further example, the fibers have an average diameter of less than about 8 microns. In an even further example, the fibers have an average diameter of or less than about 5 microns. However, the average fiber diameter is generally greater than 0.1 microns, greater than 0.2 microns, or greater than 0.5 microns The tubular porous fiber filter of the present disclosure may comprise fibers with different diameters, and the different diameter fibers may have different ratios. For example, the filter may contain more than one kind of fiber. One fiber may have a diameter of 10 microns while another fiber may have a diameter of 5 microns. Further, these two kinds of fibers may be present at various ratios (weight %). Non limiting examples of various ratios include but are not limited to 80% to 20%, 70% to 30%, 60% to 40%, or 50% to 50%.

Figure 4:
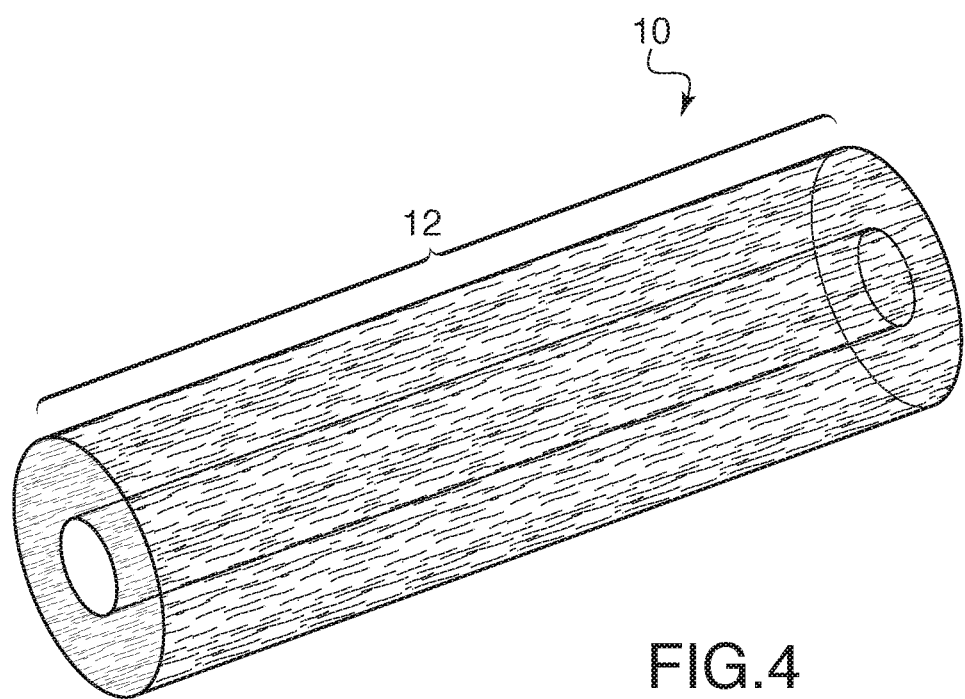
FIG. 4. Side perspective view of a tubular porous fiber filter having a fiber orientation along the length of the filter.

FIG. 4 illustrates one example a tubular porous fiber filter 10 that has a fiber orientation along a length 12 of the filter 10. In this example, the fibers are generally aligned along the length and extend in the length direction. For example, the fibers may be oriented generally in parallel along a long axis of the filter. As otherwise described herein, the fibers may be bicomponent fibers.

Figure 5A:
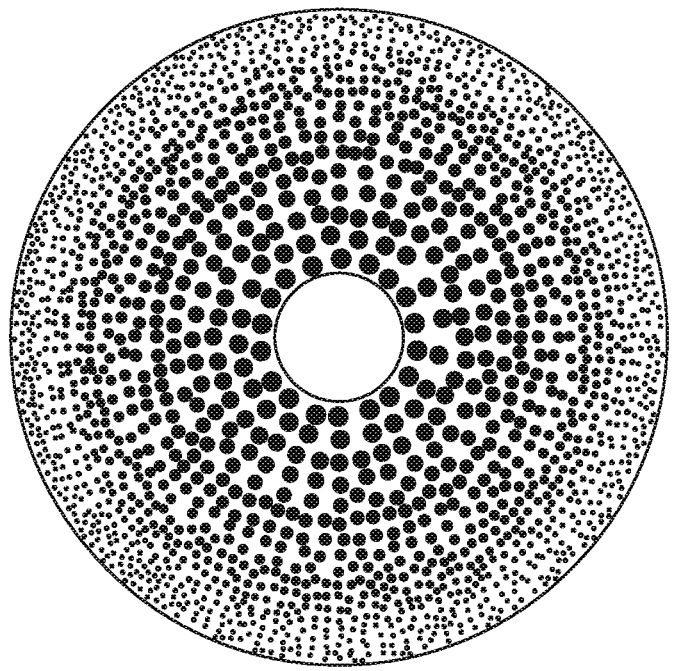
FIG. 5A. Side perspective view of a tubular porous fiber filter having a larger pore size along an internal surface (the inner diameter) and a smaller pore size on the external surface (the outer diameter).
Figure 5B:
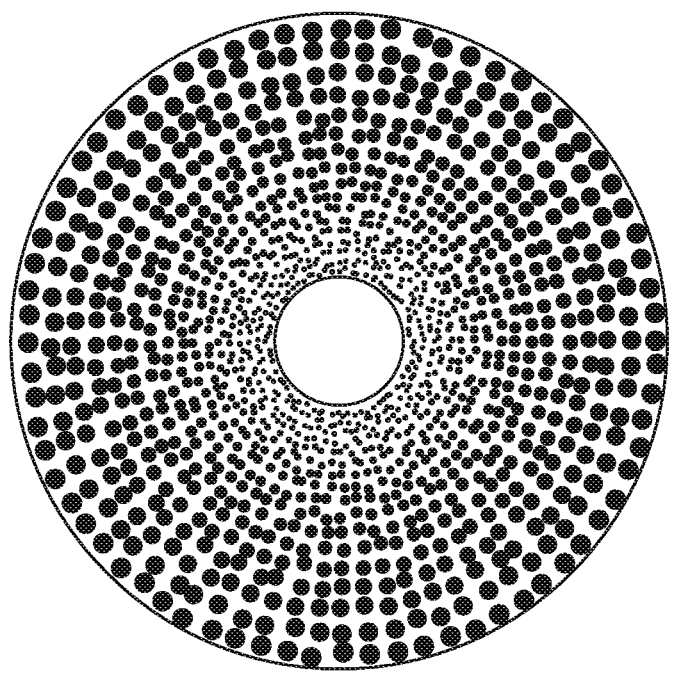
FIG. 5B. Side perspective view of a tubular porous fiber filter having a smaller pore size along an internal surface (the inner diameter) and a larger pore size on the external surface (the outer diameter).

The tubular porous fiber filter 20 of the present disclosure may have a gradient structure. One example is illustrated by FIGS. 5A and 5B. In the example shown by FIG. 5A, the filter 20 may have a smaller pore size at the external surface 14 than at the internal surface 16. This is shown schematically by denser or smaller diameter fibers at the external surface. For example, pore sizes along the external surface 14 may be about 1 to about 50 microns. Pore sizes along the internal surface 16 may be about 10% or 20% or 50% or 100% larger. In the example shown by FIG. 5B, the filter may have a smaller pore size at the internal surface 16 than at the external surface 14. This is shown schematically by denser or smaller diameter fibers at the internal surface. For example, pore sizes along the internal surface 16 may be about 1 to about 50 microns. Pore sizes along the external surface 14 may be about 10% or 20% or 50% or 100% larger. In liquid filtration applications, when surface filtration property is preferred, the liquid flow would be in the direction from the smaller pore size surface to the larger pore size surface. This is illustrated by FIG. 6.

In an alternate embodiment, all fibers may have the same or similar fiber density or diameter throughout the structure. This is schematically illustrated by FIG. 4. This may be referred to as a homogeneous fiber distribution.

Figure 6:
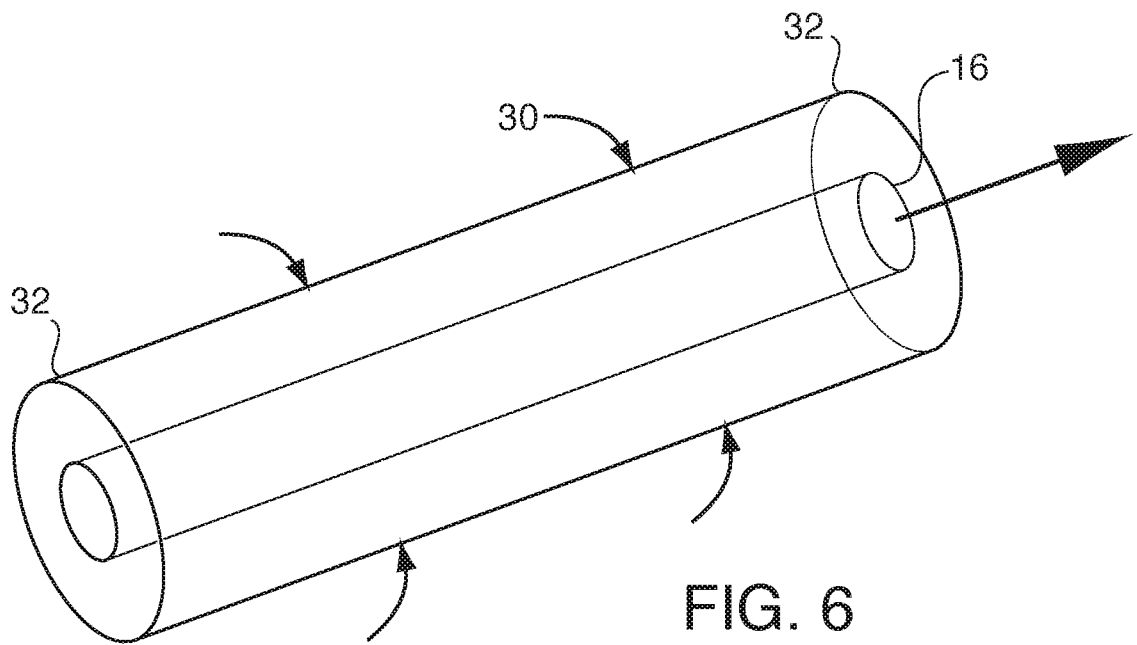
FIG. 6. Side perspective view of a tubular porous fiber filter showing flow entering a side of tube and exiting from one of the ends of the internal diameter of the tube.
Figure 7:
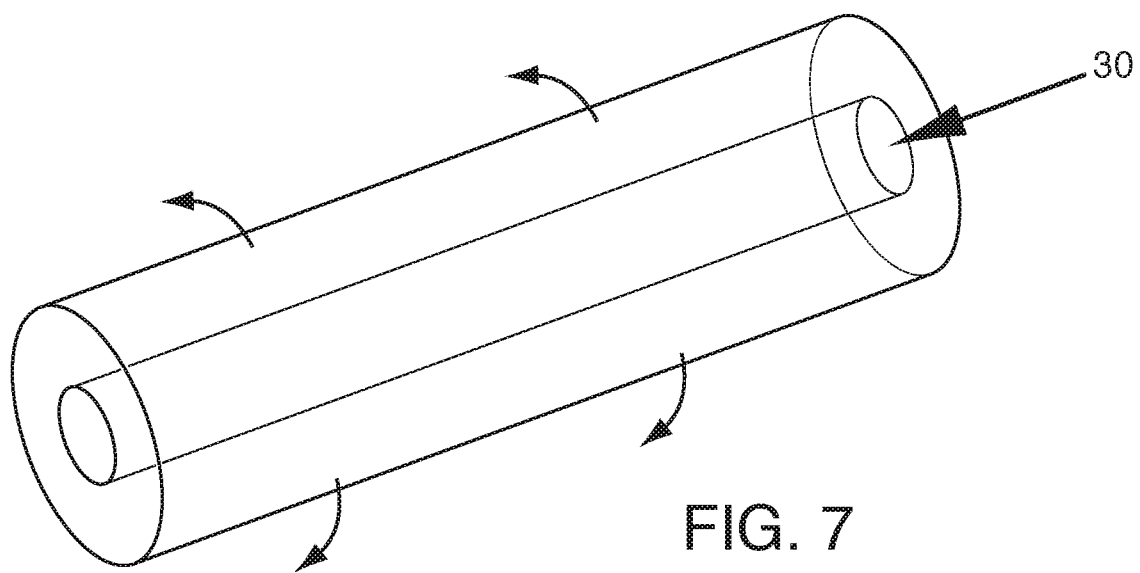
FIG. 7. Side perspective view of a tubular porous fiber filter showing flow entering the internal diameter of tube at one of the ends and exiting sides of the tube.

In FIG. 6, flow 30 moves from the outside of the filter to the inside of the filter. Flow 30 exits one of the ends of the filter via way of the internal surface 16. This may be referred to as outside-inside filtration or "pressure differential" filtration. This could be achieved by adding positive pressure from outside or pulling vacuum from inside. When deep filtration property is preferred, the liquid flow would be in the direction from the larger pore size surface to the smaller pore size surface. This is illustrated by FIG. 7. In FIG. 7, flow 30 moves from the inside of the filter to the outside of the filter. Flow 30 enters at one of the ends 32 of the filter and exits via way of the external surface 14. This may be referred to as inside-outside filtration or "cross flow" filtration. This disclosed design will provide the tubular filter with improved filtration efficiency and longevity. The pore size differences between the smaller and larger surface could be, 10, 20, 50 or 100%. For example, the pore size of internal surface and external surface could vary from 1 to 50 microns independently, or from 2 to 20 microns independently.

The fibers in tubular porous fiber filters of the present disclosure can be bicomponent fibers, monocomponent fibers or combinations of bicomponent fiber and monocomponent fibers.

In one embodiment, the fiber used to make the tubular porous fiber filters of the present disclosure may be a bicomponent fiber. These bicomponent fibers include, but are not limited to, polyethylene/polypropylene (PE/PP), polyethylene/polyethylene terephthalate (PE/PET), polypropylene/polyethylene terephthalate (PP/PET), polyethylene terephthalate polypropylene/(PET/PP), co-polyethylene terephthalate/polyethylene terephthalate (co-PET/PET), polyethylene terephthalate/Nylon (PET/Nylon), Nylon/polyethylene terephthalate (Nylon/PET), ethylene vinyl alcohol/polyethylene terephthalate (EVOH/PET), Nylon/Nylon, EVOH/Nylon, and PET/polybutylene terephthalate (PET/PBT). Bicomponent fibers may have different cross-sectional structures, such as core/sheath, side-by-side, tipped, islands in the sea, and segmented pie. The bicomponent fibers can also have different shapes, such as round, trilobal, and cross shaped structures.

In one embodiment, the bicomponent fibers may have a core/sheath structure. In a specific example, the sheath may have a higher melting point than the core. In an alternate example, the core may have a higher melting point than the sheath.

The tubular porous fiber filters of the present disclosure may have a structure in which the fibers in the filter are predominantly oriented along the long axis of the tubular filter.

In various embodiments, the tubular porous fiber filters of the present disclosure have a structure in which the void space in the filter is less than about 70%. In other examples, the void space may be less than about 60%, less than about 50%, less than about 40% or less than about 30% based on the following calculation.

Void Volume or Porosity (%)=[1−(Bulk Density)/(Material or Fiber Density)]×100

Where: Bulk Density (g/cc)=Weight of the Part (g)/Volume of the Part (cc)

Fiber Density(g/cc)=[(Density of Polymer-1)×(Wt. % of Polymer-1)+(Density of Polymer-2)×(Wt. % of Polymer-2)]/100

In different embodiments, the void space in the tubular porous fiber filter may be less than about 60%. In other examples, the void space may be less than about 50%, less than about 40%, or less than about 30% based on the mercury intrusion test (ASTM D4404).

The tubular porous fiber filters of the present disclosure can filter out particles 5 microns in size at an efficiency greater than 95%. In a specific example, the filtration level may be greater than 98%. In an even further example, the filtration level may be greater than 99%.

In other examples, the tubular porous fiber filters of the present disclosure can filter out particles that are about 3 microns in size at the above efficiency rates. In further examples, the tubular porous fiber filters of the present disclosure can filter out particles 2 microns in size at the above efficiency rates. In even further examples, the tubular porous fiber filters of the present disclosure can filter out particles that are 1 micron in size at the above efficiency rates. In even further examples, the tubular porous fiber filters of the present disclosure can filter out particles that are 0.5 micron in size at the above efficiency rates.

The tubular porous fiber filters of the present disclosure may have a flow rate for water at least 500 gallons per square foot, per day (GFD) at a pressure of 30 psi; at least 1000 GFD at a pressure of 30 PSI; or at least 2000 GFD at a pressure of 30 PSI. The tubular porous fiber filters of the present disclosure can be used in positive pressure filtration. Filtration options include cross flow filtration, or negative pressure based filtration, such as vacuum based filtration.

In one embodiment, the tubular porous fiber filters of the present disclosure can be used in filtration applications in which liquids flow from inside the tube to the outside of the tube. In another embodiment, the tubular porous fiber filters of the present disclosure can be used in filtration applications in which liquids flow from outside the tube to inside the tube.

The disclosed tubular porous fiber filters may be produced by polymer extrusion. Neat polymer is extruded through a die in which a known number of holes are present at known spacing and known diameter. Hot air at a fixed temperature and fixed velocity causes the extension of the extruded polymer fibers. Examples of the process air temperature vary between 200° C. to 320° C., and air velocity between 100 cfm and 500 cfm. The fibers are collected on a belt moving at fixed and known velocity. The extruded polymer fibers are shaped through a die of fixed dimensions, without the use of lubricants or other process aids. The porous fiber filters are cut to desired lengths. For example, the lengths of the filters can be 2 to 50 inches, 3 to 45 inches or 4 to 40 inches. Of course, it should be understood that other lengths may be used and are considered within the scope of this disclosure.

The tubular porous fiber filters of the present disclosure can be further coated with polymeric membranes. The coating membranes and process of coating polymeric membrane onto the tubular porous fiber filters of present disclosure are described in U.S. Pat. No. 7,833,615 and U.S. Pat. No. 8,349,400. The polymeric membrane coating could be at the internal surface, the external surface, or at both the internal and the external surfaces of the tubular fiber filters.

The tubular porous fiber filters of the present disclosure can be used in bioprocesses. Nonlimiting examples include downstream processes in biopharmaceutical manufacturing; food processing, such as milk, wine or juice processing; water filtration, such as waste water treatment, oil production, and swimming pool filtration.

The tubular porous fiber filters of the present disclosure can be used as pre-filters for current membrane-based ultrafiltration, nanofiltration, and reverse-osmosis (RO) devices for reducing fouling of the membrane.

The following examples will serve to further illustrate the present disclosure without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the disclosure.

Example 1

Porous Tubular Fiber Filters

Porous tubular fiber filters were made from bicomponent polyethylene terephthalate (PET)/polypropylene (PP) fiber. PET was the sheath of each fiber with PP at the core. The weight percentage (wt. %) of PET was 30% and the wt. % of PP was 70% in the bicomponent fibers. Filters were made as described above.

TABLE 1

| Sample ID | Outer Diameter (mm) | Inner Diameter (mm) | Density (g/cc) | Fiber Size (μm) | Calc. Porosity (%) | Pore Size (μm) | Pore Volume (%) |
| --- | --- | --- | --- | --- | --- | --- | --- |
| X8060AA | 7.54 | 1.50 | 0.51 | 9.69 | 51.4 | 12.46 | 38.52 |
| X8060BA | 7.53 | 1.47 | 0.53 | 9.69 | 49.5 | 12.62 | 38.63 |

TABLE 1-continued

| Sample ID | Outer Diameter (mm) | Inner Diameter (mm) | Density (g/cc) | Fiber Size (μm) | Calc. Porosity (%) | Pore Size (μm) | Pore Volume (%) |
| --- | --- | --- | --- | --- | --- | --- | --- |
| X8060CA | 7.51 | 1.45 | 0.57 | 9.69 | 45.7 | 10.96 | 33.21 |
| X8060DA | 7.49 | 1.48 | 0.62 | 9.69 | 41.0 | 9.48 | 26.24 |
| X8060E | 7.56 | 1.52 | 0.40 | 6.38 | 61.9 | 13.58 | 53.54 |
| X8060F | 7.55 | 1.49 | 0.43 | 6.38 | 59.0 | 13.04 | 49.45 |
| X8060G | 7.52 | 1.47 | 0.47 | 6.38 | 55.2 | 10.81 | 33.21 |
| X8060H | 7.49 | 1.46 | 0.51 | 6.38 | 51.4 | 9.35 | 36.75 |

Pore size (μm) and pore volume (%) is based mercury intrusion based on ASTM D4404-10

TABLE 2

| Sample ID | Target Outer Diameter (mm) | Target Inner Diameter (mm) | Target Density (g/cc) | Target Fiber Size (μm) | Theor. Calc. Porosity (%) |
| --- | --- | --- | --- | --- | --- |
| X8096A | 6.35 | 1.50 | 0.40 | 6.38 | 61.9 |
| X8096B | 6.35 | 1.50 | 0.40 | 9.7-10 | 61.9 |
| X8096C | 6.35 | 1.50 | 0.51 | 6.38 | 51.4 |
| X8096D | 6.35 | 1.50 | 0.51 | 9.69 | 51.4 |
| X8096E | 6.93 | 2.00 | 0.40 | 6.38 | 61.9 |
| X8096F | 6.93 | 1.50 | 0.40 | 6.38 | 61.9 |
| X8102A | 6.35 | 1.50 | 0.44 | 6.38 | 58.1 |
| X8102B | 6.35 | 1.50 | 0.44 | 9.7-10 | 58.1 |
| X8102C | 6.35 | 1.50 | 0.56 | 6.38 | 46.7 |
| X8102D | 6.35 | 1.50 | 0.56 | 9.69 | 46.7 |
| X8102E | 6.93 | 2.00 | 0.44 | 6.38 | 58.1 |
| X8102F | 6.93 | 1.50 | 0.42 | 6.38 | 60.0 |

All patents, publications and abstracts cited above are incorporated herein by reference in their entirety. It should be understood that the foregoing relates only to preferred embodiments of the present disclosure and that numerous modifications or alterations may be made therein without departing from the spirit and the scope of the present disclosure as defined in the following claims.

What is claimed is:

1. A self-supporting seamless tubular porous cross-flow fiber filter for liquid comprising bicomponent fibers wherein the bicomponent fibers are oriented generally in parallel along a long axis of the filter, wherein the filter has a wall thickness of 2 mm or greater, a void space in the filter that is less than about 60%, and wherein the filter is self-supporting,
wherein the cross-flow filter for liquid has a burst pressure of over 100 psi and a filtration efficiency of at least 95% for filtering particles about 5 microns in size or smaller in a liquid solution;
wherein the bicomponent fibers are thermally fused together without a binding agent and wherein the bicomponent fibers each comprise a core and a sheath and the sheath has a higher melting temperature than the core.

2. The tubular porous fiber filter of claim 1, wherein the filter has an outer diameter of between about 2 mm to less than about 25 mm.

3. The tubular porous fiber filter of claim 1, wherein the filter has a filtration efficiency of at least 95% for filtering particles 3 microns in size in a liquid solution.

4. The tubular porous fiber filter of claim 1, wherein the filter has a filtration efficiency of at least 95% for filtering particles 2 microns in size in a liquid solution.

5. The tubular porous fiber filter of claim 1, wherein the filter has a filtration efficiency of at least 95% for filtering particles 1 micron in size in a liquid solution.

6. The tubular porous fiber filter of claim 1, wherein the filter has a filtration efficiency of at least 95% for filtering particles 0.5 microns in size in a liquid solution.

7. The tubular porous fiber filter of claim 1, wherein the bicomponent fibers are selected from the group consisting of polyethylene/polypropylene (PE/PP), polyethylene/polyethylene terephthalate (PE/PET), polypropylene/polyethylene terephthalate (PP/PET), polyethylene terephthalate/polypropylene (PET/PP), co-polyethylene terephthalate/polyethylene terephthalate (co-PET/PET), polyethylene terephthalate/Nylon (PET/Nylon), Nylon/polyethylene terephthalate (Nylon/PET), ethylene vinyl alcohol/polyethylene terephthalate (EVOH/PET), Nylon/Nylon, EVOH/Nylon, or PET/polybutylene terephthalate (PET/PBT).

8. The tubular porous fiber filter of claim 1, wherein the filter has an internal surface and an external surface, wherein the internal surface comprises pore sizes that are larger than pore sizes of the external surface.

9. The tubular porous fiber filter of claim 1, wherein the filter has an internal surface and an external surface, wherein the internal surface comprises pore sizes that are smaller than pore sizes of the external surface.

10. The tubular porous fiber filter of claim 8, comprising a pore size differential between about 10% to about 100%.

11. The tubular porous fiber filter of claim 1, wherein the filter comprises fibers having a generally homogeneous fiber distribution.

12. A vacuum filtration device comprising the tubular porous fiber filter of claim 1.

13. The tubular porous fiber filter of claim 9, comprising a pore size differential between about 10% to about 100%.

14. The tubular porous fiber filter of claim 1,
wherein the filter has an internal surface and an external surface, wherein the internal surface comprises pore sizes that are different than pore sizes of the external surface;
wherein the bicomponent, generally parallel fibers vary in at least one of density or diameter between the external and internal surfaces such that the internal surface pore sizes are different from the external surface pore sizes.

15. The tubular porous fiber filter of claim 14, wherein the pore sizes of the filter define a gradient between the internal and external surface.

16. The tubular porous fiber filter of claim 1, wherein the filter is coated with a polymeric membrane.

* * * * *